United States Patent
Murakami et al.

(10) Patent No.: US 6,936,945 B2
(45) Date of Patent: Aug. 30, 2005

(54) PERMANENT MAGNET SYNCHRONOUS MOTOR

(75) Inventors: Hiroshi Murakami, Suita (JP);
Noriyoshi Nishiyama, Izumiotsu (JP);
Taro Kishibe, Nishinomiya (JP);
Haruhiko Kado, Moriyama (JP);
Toshiyuki Tamamura, Kusatsu (JP);
Hisakazu Kataoka, Takefu (JP);
Masayuki Shinto, Takefu (JP); Osaaki Morino, Takefu (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/311,522

(22) PCT Filed: Jun. 14, 2001

(86) PCT No.: PCT/JP01/05084

§ 371 (c)(1),
(2), (4) Date: Apr. 28, 2003

(87) PCT Pub. No.: WO01/97363

PCT Pub. Date: Dec. 20, 2001

(65) Prior Publication Data

US 2003/0168924 A1 Sep. 11, 2003

(30) Foreign Application Priority Data

Jun. 14, 2000 (JP) .................................... 2000-177951

(51) Int. Cl.[7] .......................... H02K 21/12; H02K 1/27
(52) U.S. Cl. ........................ 310/156.56; 310/154.11; 310/261; 310/156.01
(58) Field of Search .................... 310/152, 154.11, 310/154.21, 154.22, 154.23, 154.25, 156.01, 156.38, 156.45, 156.53, 156.56, 216, 261, 272, 273, 156.54, 156.55, 156.57

(56) References Cited

U.S. PATENT DOCUMENTS

| | | | | |
|---|---|---|---|---|
| 4,748,359 A | * | 5/1988 | Yahara et al. | 310/156.13 |
| 5,936,323 A | | 8/1999 | Shibukawa et al. | |
| 5,990,591 A | * | 11/1999 | Yamaguchi et al. | 310/156.53 |
| 6,239,525 B1 | * | 5/2001 | Matsunobu et al. | 310/156.38 |
| 6,274,960 B1 | * | 8/2001 | Sakai et al. | 310/156.02 |
| 6,342,745 B1 | * | 1/2002 | Sakai et al. | 310/156.56 |
| 6,552,461 B2 | * | 4/2003 | Takahata et al. | 310/156.53 |
| 6,552,462 B2 | * | 4/2003 | Sakai et al. | 310/156.78 |
| 6,664,688 B2 | * | 12/2003 | Naito et al. | 310/156.01 |
| 2002/0171309 A1 | * | 11/2002 | Wakui et al. | 310/156.48 |

FOREIGN PATENT DOCUMENTS

| | | | | |
|---|---|---|---|---|
| EP | 0352573 | * | 7/1989 | ........... H02K/21/46 |
| EP | 0 352 573 A1 | | 1/1990 | |
| EP | 0 823 771 A1 | | 2/1997 | |
| EP | 0 809 343 B1 | | 5/1997 | |
| EP | 0 809 343 A1 | | 11/1997 | |
| EP | 1 014 541 A1 | | 9/1998 | |
| JP | 63 140645 A | | 6/1988 | |

(Continued)

Primary Examiner—Burton S. Mullins
Assistant Examiner—Heba Y. Elkassabgi
(74) Attorney, Agent, or Firm—Rossi, Kimms & McDowell, LLP

(57) ABSTRACT

A structure of a rotor used in a synchronous motor employing both of permanent magnets and a stator using concentrated windings is disclosed. Slits (13) provided in a section of a rotor laminated in a direction of a rotary shaft are shaped like an arc or a bow, and the shape protrudes toward an outside rim of rotor (12). Permanent magnets (14) are inserted into slits (13). This structure produces less magnetic salient poles than a conventional rotor, so that a magnetic flux density can be lowered, and an efficient motor with less loss is obtainable.

12 Claims, 9 Drawing Sheets

FOREIGN PATENT DOCUMENTS

| JP | 05111204 | * | 4/1993 | ............ H02K/1/27 |
| JP | 5-304737 A | | 11/1993 | |
| JP | 05304737 | * | 11/1993 | ............ H02K/1/27 |
| JP | 11-220846 A | | 8/1999 | |
| JP | 11-220846 | * | 8/1999 | ............ H02K/1/27 |
| JP | 2000-116172 A | | 4/2000 | |
| JP | 2000-116172 | * | 4/2000 | ........... H02K/21/14 |
| JP | 200-134836 | * | 5/2000 | ............ H02K/1/27 |
| JP | 2000-134836 A | | 5/2000 | |
| WO | WO99/13556 | | 3/1999 | |
| WO | WO-99/13556 | * | 3/1999 | .......... H02K/21/16 |

* cited by examiner a < b

US 6,936,945 B2

PERMANENT MAGNET SYNCHRONOUS MOTOR

TECHNICAL FIELD

The present invention relates to a synchronous motor equipped with both interior magnets and a stator using concentrated windings.

BACKGROUND ART

FIG. 11 shows a conventional synchronous motor equipped with interior magnets and a stator using concentrated windings. As shown in FIG. 11, the motor includes a stator 1 having concentrated windings, a rotor 2, slits 3 provided in the rotor, permanent magnets 4 located in the slits 3. Stator 1 is formed of a concentrated-winding stator having three phases, four poles and six slots. As shown in FIG. 12, respective teeth are wound with windings independently, and each phase includes two coils 180 degrees apart from each other, i.e., opposite to each other. Slits 3 shaped like a flat plate are prepared inside rotor 2, and permanent magnets having a similar shape to slit 3 are inserted in slits 3 respectively. As shown in FIG. 12, a motor using the concentrated windings provides independent windings to respective teeth, so that its coil ends are smaller than those of a distributed-winding stator, where the windings straddle over plural teeth. Thus wire-wound resistance becomes less, and copper loss caused by heat of the windings due to current running through the motor can be reduced. As a result, a highly efficient motor with smaller loss is obtainable.

The concentrated windings as shown in FIG. 11 have teeth wound with coils respectively, and the coils of respective phases are adjacent to each other. This structure produces greater inductance. The combination of this stator with a rotor having interior magnets produces magnetic salient poles in the rotor, so that reluctance torque becomes available. However, this structure increases inductance, and a lot of magnetic flux flows into the flux path along axis "q", and the flux path pulls the magnetic flux into the rotor as shown in FIG. 11. Thus a magnetic flux density of the core substantially increases. As a result, iron loss greatly increases although the copper loss decreases, so that efficiency is lowered, which render the advantage of the concentrated windings insignificant. The present invention addresses the foregoing problem, and aims to provide a rotor of a synchronous motor having the concentrated windings. This rotor advantageously lowers the magnetic flux density of the stator core, and yet reduces copper loss and iron loss.

SUMMARY OF THE INVENTION

The present invention provides a rotor of a synchronous motor having both of permanent magnets and a stator using a concentrated winding method. On a section of the rotor laminated in a rotary shaft direction, arc-shaped or bow-shaped slits are provided. The projecting portion of the arc-shape or bow shape face to the outside rim of the rotor, and permanent magnets are inserted into the slits. This structure produces less magnetic salient poles than a conventional rotor, thereby reducing a magnetic flux density of the stator core. This structure can thus provide a highly efficient motor that incurs less loss.

V-shaped slits instead of the arc- or bow-shaped slits can produce a similar advantage. In this case, a vertex of the V-shape faces to the outside rim of the rotor. Further, two sheets of permanent magnets can be inserted into each one of the V-shaped slits, so that a cost of the magnets is reduced. As a result, an efficient and inexpensive motor is obtainable.

Magnets used in the present invention can be any magnets such as ferrite magnet, rare-earth magnet or the like regardless of magnet materials; however, a structure employing the rare-earth magnet, which produces strong magnetic force among others, can reduce iron loss, so that the greatest advantage can be expected. Dividing the rare-earth magnet axially into plural magnets reduces loss due to eddy-current running on magnet surface, so that further efficient motor is achievable.

BRIEF DESCRIPTIONS OF THE DRAWINGS

Figure 6:
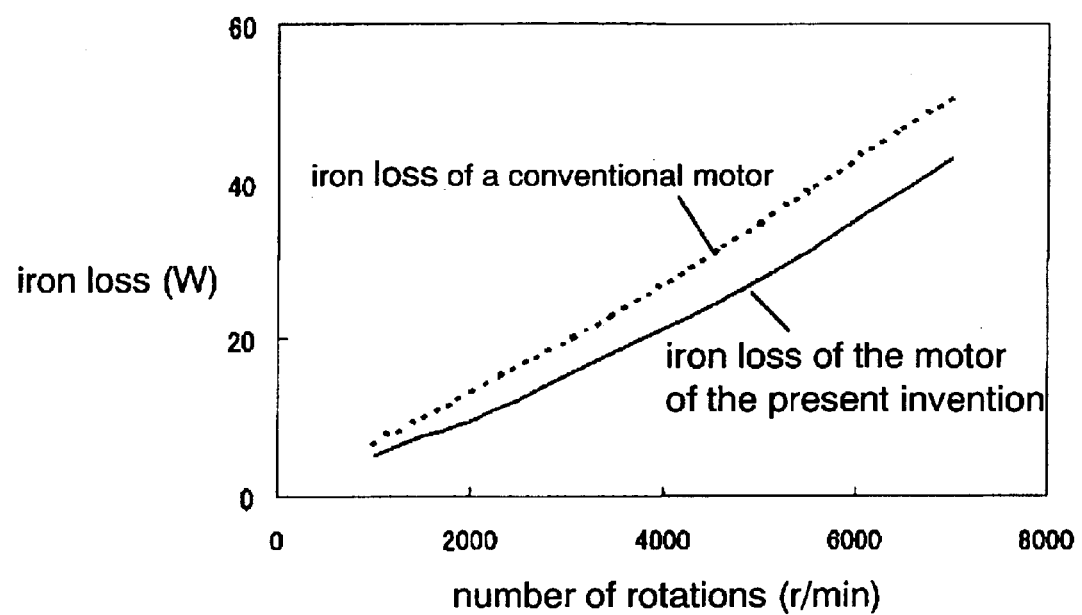

FIG. 6 compares iron loss produced in the first embodiment with that produced by a conventional motor.

Figure 7:
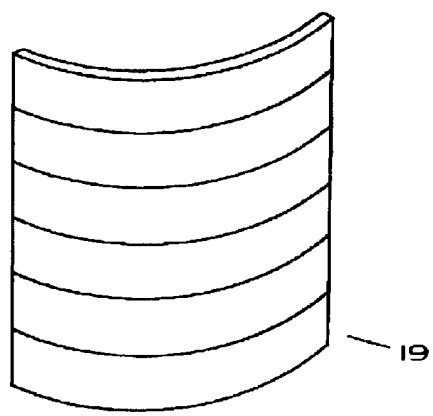

FIG. 7 shows divided permanent magnets.

Figure 8:
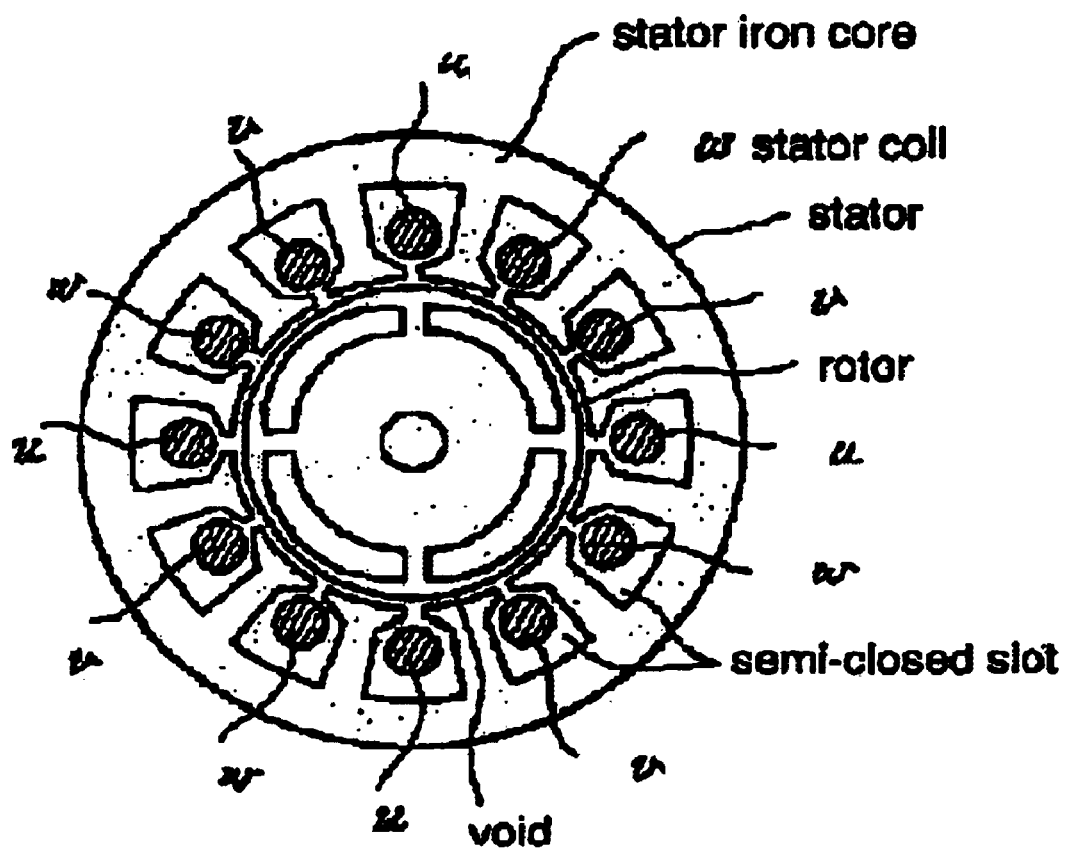

FIG. 8 shows a conventional motor.

Figure 9:
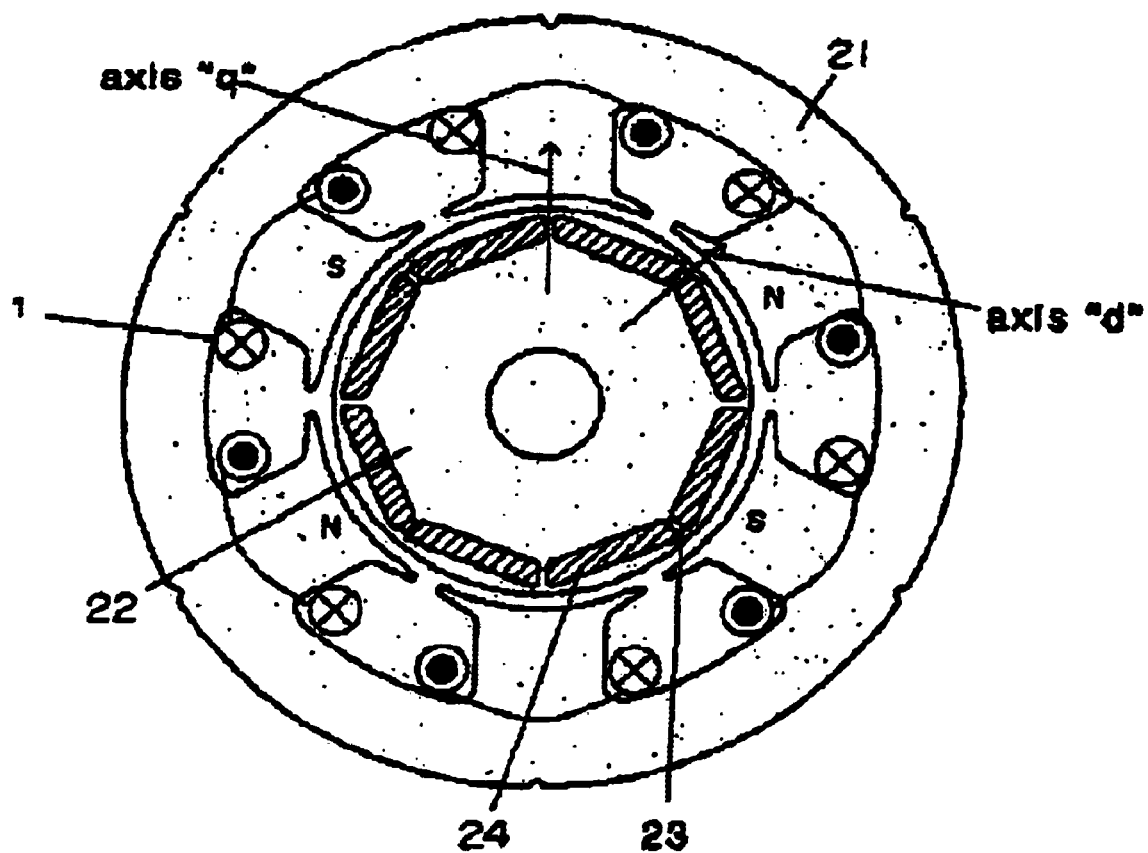

FIG. 9 shows a sectional view of a motor in accordance with a second exemplary embodiment.

Figure 10:
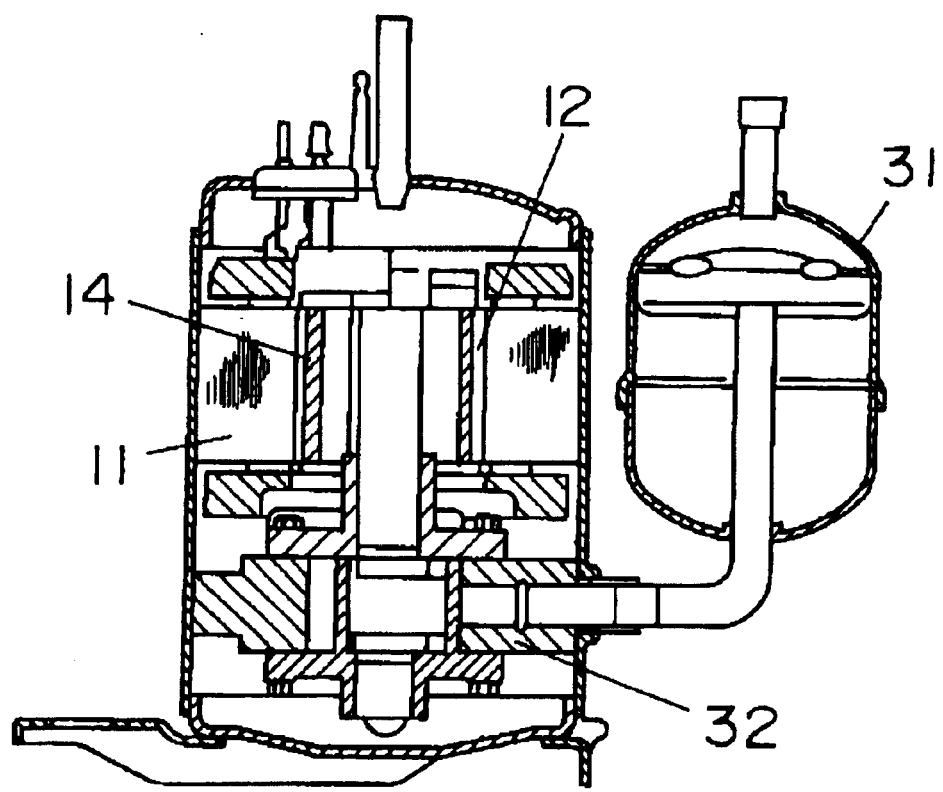

FIG. 10 shows a compressor in accordance with a third exemplary embodiment.

Figure 10A:
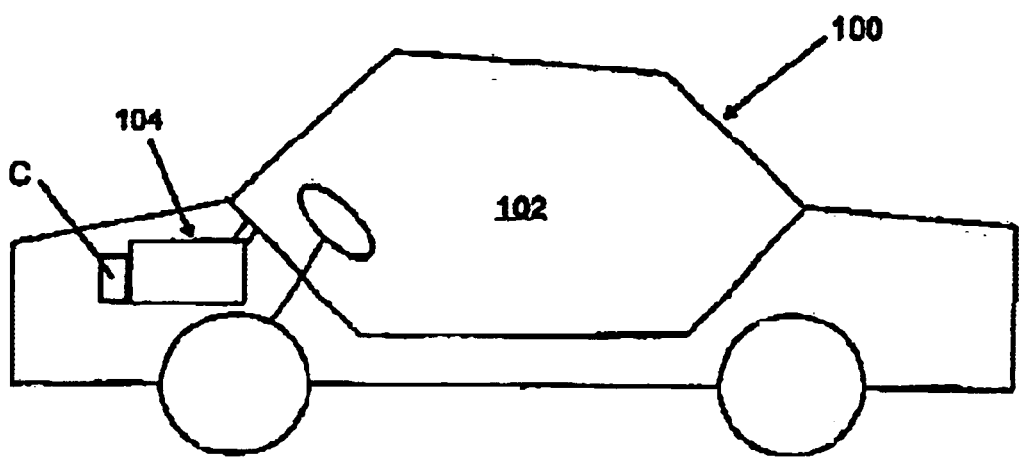

FIG. 10A schematically illustrates a vehicle with an air-conditioning unit that incorporates a compressor of FIG. 10.

Figure 11:
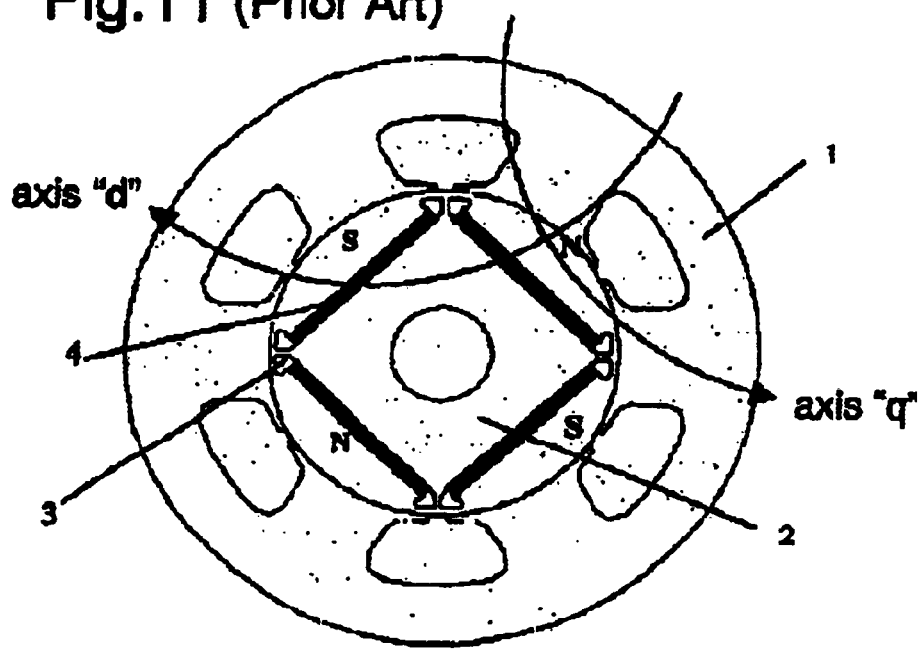

FIG. 11 shows a sectional view of a conventional motor.

Figure 12:
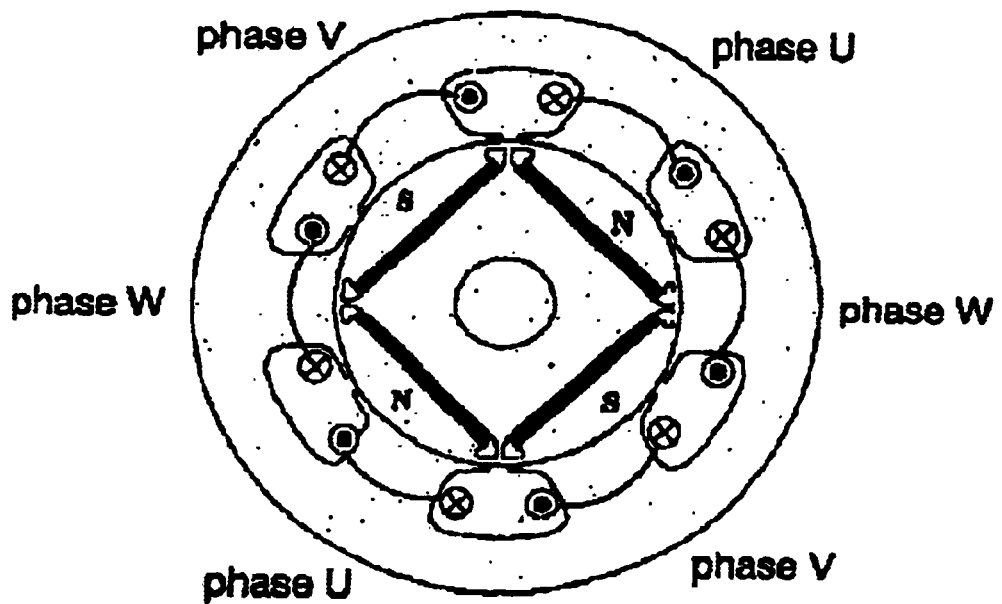

FIG. 12 illustrates conventional concentrated windings.

DETAILED DESCRIPTION OF THE PREFERRED EMBODIMENTS

Exemplary embodiments of the present invention are demonstrated hereinafter with reference to the accompanying drawings. The embodiments below are exemplary reductions to practice of the present invention, and not to limit the technical scope of the present invention.

Exemplary Embodiment 1

Figure 1:
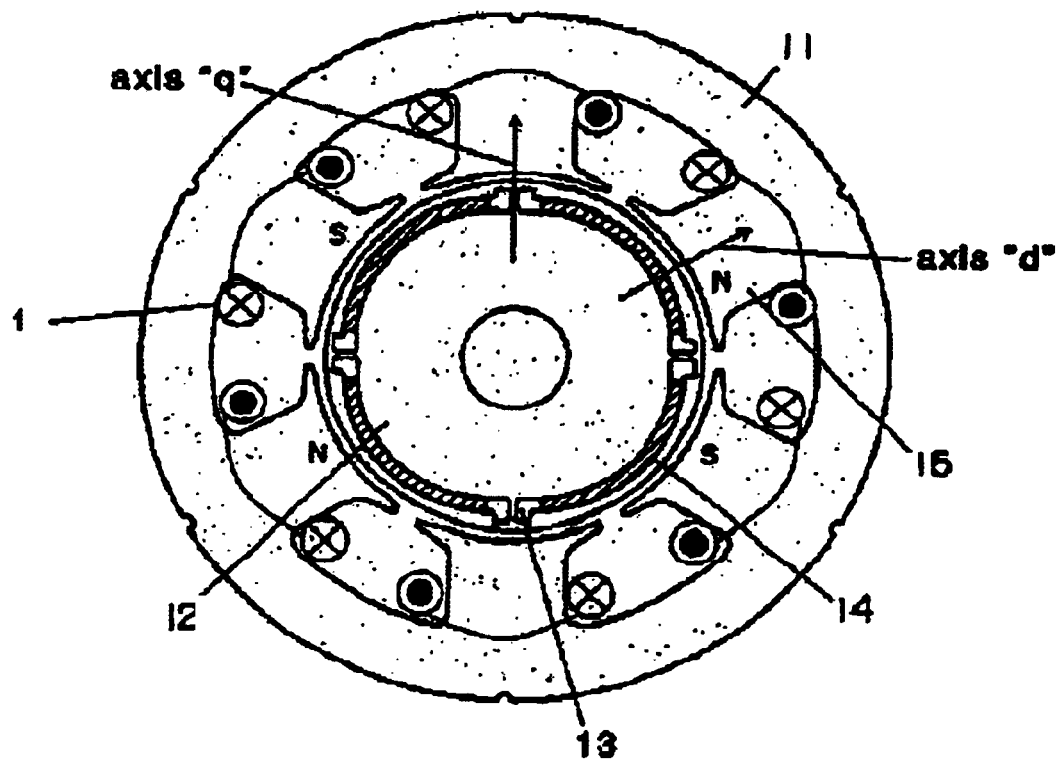
FIG. 1 shows a sectional view of a motor in accordance with a first exemplary embodiment.
Figure 3:
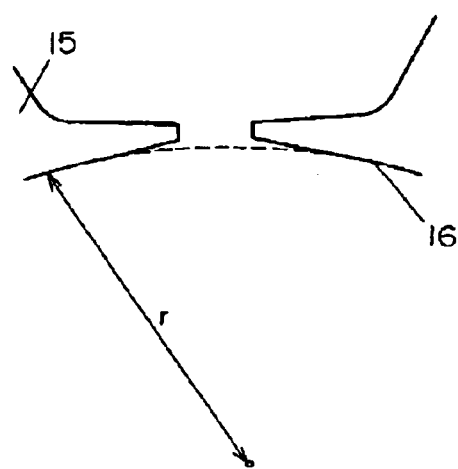
FIG. 3 is an enlarged view of teeth of the motor in accordance with the first embodiment.

FIG. 1 illustrates the first exemplary embodiment, a structure is provided that includes a stator 11 employing concentrated windings 1, a rotor 12, slits 13, and permanent magnets 14 located in the slits. Stator 11 has three phases, four poles and six slots. Each one of teeth is wound independently with a winding, and two coils of each phase are apart 180 degrees from each other, i.e., opposite to each other. Stator 11 is formed by laminating plural electromagnetic steel sheets in a rotary shaft direction, and includes plural teeth. Ends of each one of teeth 15 slightly encroach into slots as shown in FIG. 3.

To be more specific, distance "r" between arc face 16, which faces to rotor 12, of stator 11 and the center of rotor 12 is smaller at a center portion of teeth 15 than at the end of teeth 15. (The broken line tangent to arc face 16 measures a constant distance "r" from the center of rotor 12.) This structure restrains demagnetizing field from flowing to rotor 12. Because adjacent teeth of the concentrated windings become different poles from each other, and inductance increases, so that demagnetizing field tends to be applied to rotor 12. In order to overcome this phenomenon, both the ends of each one of the teeth slightly encroach into slots for enlarging air-gap at the ends of the teeth.

Each one of slits 13 prepared inside rotor 12 is shaped like an arc and protruded toward an outside rim of rotor 12. A distance between slit 13 and the outside rim of rotor 12 is narrower at the center of slit 13 and becomes gradually wider toward both the ends of the slit. At the outer most end, the distance becomes narrow again.

Permanent magnets 14 are located in slits 13, and the most outer both ends of each one of slits 13 remain void as non-magnetic portions, which work as leakage flux preventing sections that can prevent leakage flux from occurring between the adjacent permanent magnets. The ends of each of the slits 13 which act as the non-magnetic portions are not necessarily required to be voids, but resin can be filled with a resin.

Figure 2:
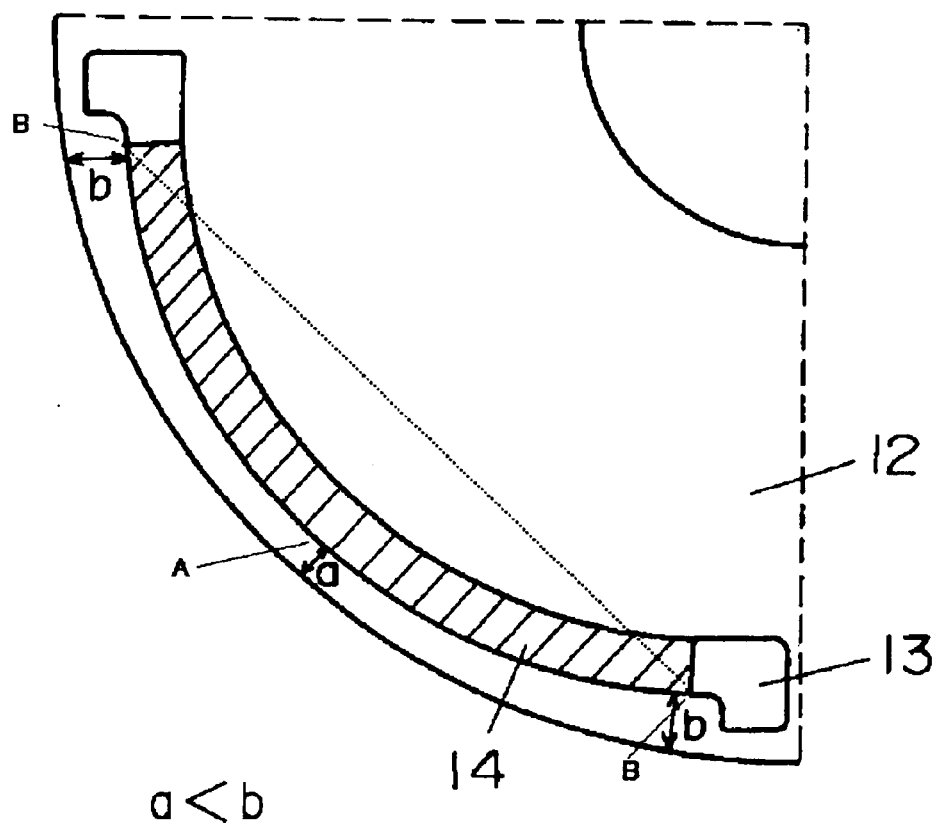
FIG. 2 is a partially enlarged view of a rotor of the motor in accordance with the first embodiment.
Figure 4:
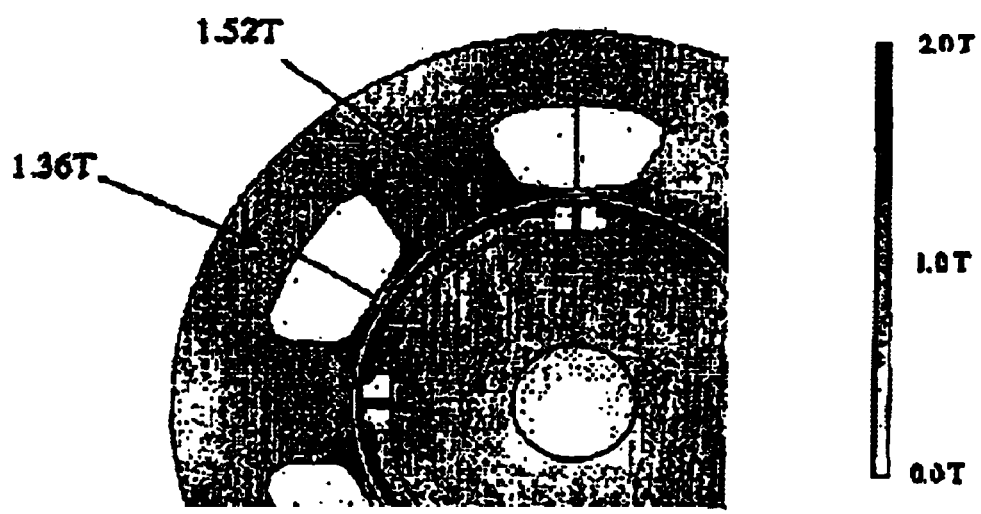
FIG. 4 illustrates magnetic flux densities of the motor in accordance with the first embodiment.
Figure 5:
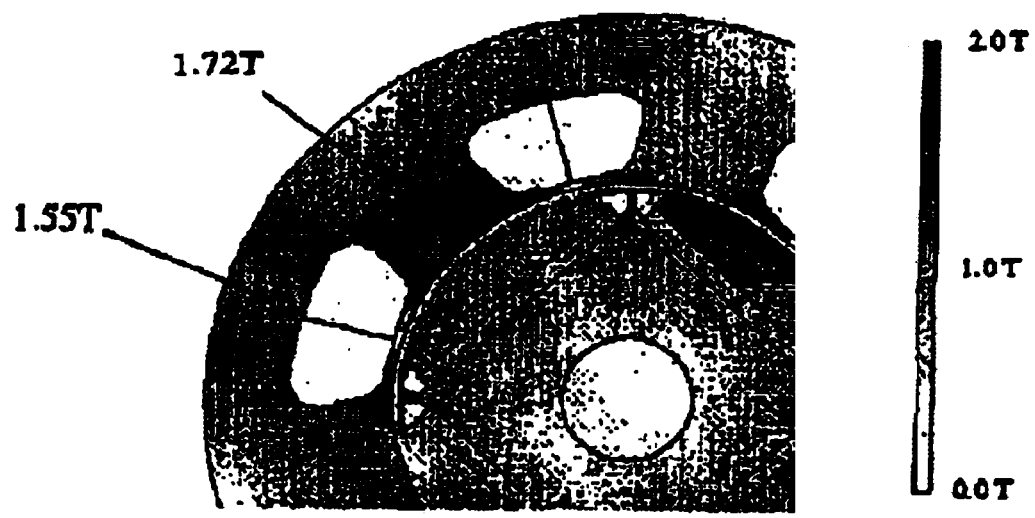
FIG. 5 illustrates magnetic flux densities of a conventional motor.

As shown in FIG. 2, permanent magnet 14 protrudes its center portion A toward the outside rim of rotor 12 from the line running through both ends B of the magnet. This shape of permanent magnet 14 prepares narrower space "a" between magnet 14 and rotor 12 at its center than space "b" at both its ends. This structure substantially narrows the flux-path width along axis "q" of the first embodiment than that of the conventional rotor. The inductance of axis "q" thus decreases, so that an amount of magnetic flux along axis "q" running inside the rotor is reduced. As a result, the magnetic flux density of the stator core when it is loaded can be lowered. FIG. 4 and FIG. 5 compare the magnetic flux density of the rotor of the present invention when it is loaded with the magnetic flux density of a conventional rotor. The rotor of the present invention has lower magnetic flux densities at its teeth and yoke of the stator core than those of the conventional rotor. Since the iron loss increases as the frequency and the magnetic flux density increase, the motor of the present invention obtains a great advantage particularly when the motor is highly loaded or spun at a high speed.

FIG. 6 compares iron loss produced in the first embodiment with that produced by a conventional motor. This graph shows the number of rotations of the motor on the X-axis and the iron loss produced by the motor on the Y-axis. As shown in FIG. 6, the rotor of the present invention produces less iron loss than the conventional one, thus a highly efficient motor producing a little loss can be provided. The graph shows that the iron loss decreases in a greater amount as the number of rotations increases, in particular, the loss decreases advantageously at a high speed rotations faster than 3000 r/min.

In the first embodiment, one piece of permanent magnet is buried in each one of the slits. However, the stator having concentrated windings tends to produce an eddy current, so that as shown in FIG. 7 the permanent magnet is divided into plural pieces 19 along the axial direction of the rotary shaft before they are buried. Thus the path length of the eddy current running on the magnet surface can be shortened, whereby loss due to the eddy current is substantially reduced. The rare-earth magnet advantageously reduces the eddy-current loss.

Japanese Patent Application Non-Examined Publication No. H05-304737 discloses a motor with permanent magnets shown in FIG. 8, apparently similar to the motor in accordance with this embodiment; however, the disclosed motor uses a stator with distributed windings. Since the stator used in this first embodiment employs the concentrated windings, adjacent poles have different polarities. The inductance thus becomes greater, which invited the present invention. However, the stator employing distributed windings does not have such a problem, thus the foregoing publication cannot anticipate the present invention.

Exemplary Embodiment 2

FIG. 9 illustrates the second embodiment of the present invention. FIG. 9 illustrates a structure that includes a stator 21 that employs the concentrated windings 1, wherein V-shaped slits 23 are formed in a rotor 22, and wherein permanent magnets 24 are located in the slits 23. The vertex of each one of the V-shaped magnets faces toward the outside rim of the rotor. This structure also can narrow the flux path along axis "q" as discussed in the first embodiment, and thus can lower the iron loss. This structure produces a similar advantage to the first embodiment. Further, as shown in FIG. 9, the permanent magnet to be buried in each slit is divided in half, and two sheets of magnet shaped like a flat plate can be inserted into the slit. Thus an efficient motor of a lower cost, which uses inexpensive and flat magnets instead of expensive and arc-shaped magnets shown in FIG. 1, can be obtained.

The V-shaped magnet shown in FIG. 9 uses two sheets of permanent magnet in one slit, so that a void is formed between the magnets forming the V-shape. The two sheets of magnet form one magnetic pole.

Exemplary Embodiment 3

FIG. 10 shows sectional view of a compressor which employs the synchronous motor having permanent magnets in accordance with the first exemplary embodiment. As shown in FIG. 10, the compressor comprises the stator 11 using the concentrated windings, rotor 12, the permanent magnets 14, an accumulator 31 and a compressing mechanism 32. The motor of this compressor has a shorter length including its coil end, and works efficiently, so that the compressor is best fit for a place where the power or the storage area is limited, such as an air-conditioner compressor C for an air-conditioning unit 104 for a vehicle 100, in particular an electric vehicle, for cooling a passenger compartment 102, as schematically illustrated in FIG. 10A.

INDUSTRIAL APPLICABILITY

In a motor having interior magnets and a stator employing the concentrated windings, a distance between the outside rim of the rotor and a slit, in which a permanent magnet is buried, is narrower at a center portion of the slit than at both the ends of the slit. This structure reduces a magnetic flux density of the stator core, so that a more efficient motor with less iron loss than conventional motors is obtainable.

What is claimed is:

1. A synchronous motor with permanent magnets comprising:

a stator having teeth and concentrated conductive windings wound around the teeth;

a rotor having a plurality of slits and permanent magnets buried in the slits; and a flux path extending between each of the permanent magnets and an outside rim of said rotor, wherein a center portion of each of the magnets is spaced radially closer to the outside rim of said rotor ends of the respective magnet to the outside rim so that, the flux path is narrower at the center portion than at the ends of each of the magnets to regulate the amount of magnetic flux flowing into the flux path.

2. The synchronous motor employing permanent magnets as defined in claim 1, wherein each of the slits has a substantially V shape protruding toward the outside rim of said rotor.

3. The synchronous motor employing permanent magnets as defined in claim 2, wherein the permanent magnets each having a flat plate configuration are arranged in the substantially V-shaped slits.

4. The synchronous motor employing permanent magnets as defined in claim 1, wherein each of the slits has a bow configuration protruding toward the outside rim of said rotor.

5. The synchronous motor employing permanent magnets as defined in claim 1, wherein each of the permanent magnets buried in the respective one of the slits is divided into a plurality of sections along an axial direction of a rotor shaft.

6. The synchronous motor employing permanent magnets as defined in claim 1, wherein the motor spins at a rotating speed not less than 3000 rpm.

7. The synchronous motor employing permanent magnets as defined in claim 1, wherein a radial distance between a center of said rotor and a face of an end of each of the teeth opposite to said rotor is greater than a radial distance between the center of said rotor and a center portion of the respective tooth.

8. The synchronous motor employing permanent magnets as defined in claim 1, wherein the motor spins using reluctance torque.

9. The synchronous motor employing permanent magnets as defined in claim 1, wherein one of the windings is wound around a first tooth of the teeth and another of the windings is wound around a second tooth of the teeth that is adjacent to the first tooth, and when the windings are powered, the windings on the first and second teeth have different polarities from each other.

10. A compressor comprising:

a synchronous motor with permanent magnets including a stator having teeth and concentrated conductive windings wound around the teeth, a rotor having a plurality of slits and permanent magnets buried in the slits, and a flux path extending between each of the permanent magnets and an outside rim of said rotor; and a compressing mechanism driven by said synchronous motor;

wherein a center portion of each of the magnets is spaced radially closer to the outside rim of said rotor than ends of the respective magnet to the outside rim so that the flux path is narrower at the center portion than at the ends of each of the magnets to regulate the amount of magnetic flux flowing into the flux path.

11. A compressor as defined in claim 10, further comprising an accumulator coupled to the compressing mechanism.

12. A car comprising:

a passenger compartment; and a car air-conditioner that conditions air within the passenger compartment, said car air-conditioner including a compressor driven by a synchronous motor with permanent magnets, wherein the synchronous motor includes a stator having teeth and concentrated conductive windings wound around the teeth, a rotor having a plurality of slits and permanent magnets buried in the slits, and a flux path extending between each of the permanent magnets and an outside rim of said rotor;

wherein a center portion of each of the magnets is spaced radially closer to the outside rim of said rotor than ends of respective magnet to the outside rim so that the flux path is narrower at the center portion than at the ends of each of the magnets to regulate the amount of magnetic flux flowing into the flux path.

* * * * *